United States Patent
Huang et al.

(10) Patent No.: US 9,383,738 B2
(45) Date of Patent: Jul. 5, 2016

(54) METHOD FOR HIGH FIDELITY MODELING OF AN AIRCRAFT ELECTRICAL POWER SYSTEM

(71) Applicant: GE AVIATION SYSTEMS LLC, Grand Rapids, MI (US)

(72) Inventors: Hao Huang, Vandalia, OH (US); Xiaochuan Jia, Vandalia, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 549 days.

(21) Appl. No.: 13/647,671

(22) Filed: Oct. 9, 2012

(65) Prior Publication Data

US 2014/0100826 A1   Apr. 10, 2014

(51) Int. Cl.
 G06G 7/48 (2006.01)
 G06F 7/60 (2006.01)
 G06G 7/54 (2006.01)
 G05B 17/02 (2006.01)

(52) U.S. Cl.
 CPC ...................................... *G05B 17/02* (2013.01)

(58) Field of Classification Search
 CPC ....................................................... G05B 17/02
 USPC ............................................... 703/4, 8, 2, 18
 See application file for complete search history.

(56) References Cited

U.S. PATENT DOCUMENTS

| | | | |
|---|---|---|---|
| 7,178,125 B1 | 2/2007 | Huang | |
| 8,510,091 B1 * | 8/2013 | Zhao et al. | 703/13 |
| 8,924,186 B1 * | 12/2014 | Zhao | 703/2 |
| 9,063,882 B1 * | 6/2015 | Zhao | G06F 17/12 |
| 2007/0211840 A1 | 9/2007 | Elfadel et al. | |

OTHER PUBLICATIONS

Dufour et al., "Real-Time Simulation on FPGA of a Permanent Magnet Synchronous Machine Drive Using a Finite-Element Based Model", 2008, 9th International Symposium on Power Electronics, Electrical Drives, Automation and Motion (SPEEDAM), Ischia, Italy, vol. 6, p. 19-26.*

Norman et al., Improving aircraft engine operability through electric system design and operation, Apr. 19-21, 2010, 5th IET International Conference on Power Electronics, Machines and Drives (PEMD), pp. 1-5.*

Norman et al., Evaluation of the dynamic interactions between aircraft gas turbine engine and electrical system, Apr. 2-4, 2008, The 4th International Conference on PowerElectronics Machines and Drives (PEMD), York, pp. 671-675.*

McNichols et al., Hardware-in-the-Loop Power Extraction Using Different Real-Time Platforms, Jul. 28-30, 2008, 6th International Energy Conversion Engineering Conference (IECEC), Cleveland, Ohio, pp. 1-7.*

(Continued)

*Primary Examiner* — Kamini S Shah
*Assistant Examiner* — Juan Ochoa
(74) *Attorney, Agent, or Firm* — GE Global Patent Operation; William S. Munnerlyn

(57) ABSTRACT

A method of high fidelity modeling an electrical power system of an aircraft, includes among other things, identifying electrical, mechanical, thermal, and EMI characteristics of the electrical power system; applying at least one circuit-based solver to model to at least one of the electrical characteristics; and applying, simultaneously with the circuit-based solver and in real-time, a field-based solver to model the remaining electrical, mechanical, thermal, and EMI characteristics.

13 Claims, 3 Drawing Sheets

(56) References Cited

OTHER PUBLICATIONS

Dr. Ramesh Agarwal, Recent Advances in Aircraft Technology, Feb. 2012, (Ed.), ISBN: 978-953-51-0150-5, InTech, pp. 1-544.*
Khalil, Multi-scale Modeling: from Electromagnetism to Grid, PHd Thesis, University of Toulouse, Dec. 14, 2009, pp. 1-123.*
Wikipedia, Electromagnetic interference, Mar. 31, 2015, pp. 1-10.*
Shridhar Nath, Finite element and boundary element analysis of electromagnetic NDE phenomena, 1992, Retrospective Theses and Dissertations, Paper 10140, Iowa State University, pp. 1-164.*
Dufour et al., FPGA-Based Real-Time Simulation of Finite-Element Analysis Permanent Magnet Synchronous Machine Drives, 2007, IEEE Power Electronics Specialists Conference PESC, pp. 909-915.*
Pimentel al., Real-Time Hardware in the Loop Simulation of Aerospace Power Systems, Jun. 25-27, 2007, 5th International Energy Conversion Engineering Conference and Exhibit (IECEC), St. Louis, Missouri, pp. 1-13.*
Usenmez et al., Real-time hardware-in-the-loop simulation of electrical machine systems using FPGAs, 2009, International Conference on Electrical Machines and Systems, ICEMS, pp. 1-6.*
EP Search Report and Written Opinion issued May 8, 2014 in connection with corresponding EP Patent Application No. 13187576.7.
CA office action issued on Mar. 23, 2016 in connection with corresponding CA Application 2829683.
Stupar et al., "Design, Modeling and Optimization of Power Electronics Systems", Swiss Federal institute of Technology Zurich, Oct. 27, 2011.

* cited by examiner

METHOD FOR HIGH FIDELITY MODELING OF AN AIRCRAFT ELECTRICAL POWER SYSTEM

BACKGROUND OF THE INVENTION

The design, development and verification of new aircraft electrical power systems require increasing costs and lead times because of the higher complexity and demand for aircraft electrical loads, associated controls and the protection these systems require. Higher costs and lead times make new aircraft and upgrades to the legacy aircraft less affordable. As a result, the conventional approach to the design, development and verification of aircraft is becoming a less viable solution.

The current conventional approach of power system development requires multiple iterations of design, modeling, build, test, and modification. Iterations extend the cost and time of development, causing budget overruns and schedule delays. Often times, multiple iterations are needed because the design models lack sufficient fidelity to predict the outputs of the design accurately.

The Hardware-in-the-Loop (HWIL) method is increasingly used in design and development of aircraft systems, subsystems, and components because the method can be used to predict the performance of the subsystems and components in a system without having to build them. However, in order to make the method effective, two things are necessary. One is that the models in the HWIL method must be real-time; the other is that the models must have sufficient fidelity. With approaches in use today, these two requirements are not simultaneously attainable. In order to be real-time, model fidelity and accuracy are often sacrificed, or, conversely, greater model fidelity and accuracy are achieved at the expense of computation time. These trade-offs considerably limit the effectiveness of the HWIL method.

BRIEF DESCRIPTION OF THE INVENTION

One aspect of the invention relates to a method of modeling an electrical power system of an aircraft. The method comprises identifying electrical, mechanical, thermal, and EMI characteristics of the electrical power system; applying at least one circuit-based solver to model to at least one of the electrical characteristics; and applying, simultaneously with the circuit-based solver, a field-based solver to model the remaining electrical, mechanical, thermal, and EMI characteristics.

DESCRIPTION OF EMBODIMENTS OF THE INVENTION

Figure 1:
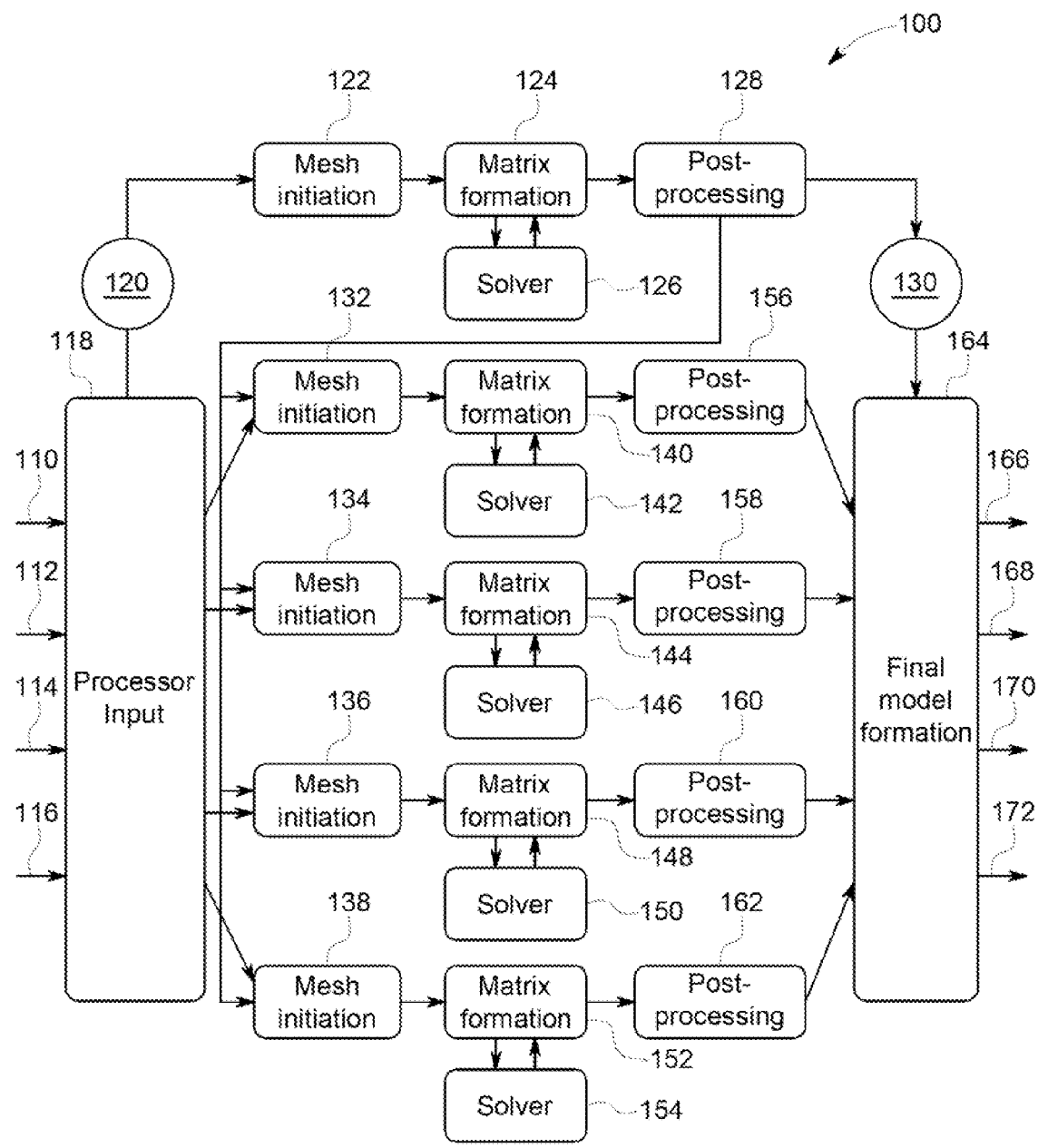
FIG. 1 is a block diagram of a hybrid combination field and circuit modeling method according to an embodiment of the present invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include a real-time model that enables high fidelity predictions with less than 1-3% error to be used in the design, build and test stages of aircraft power systems. Real-time modeling with such high fidelity additionally enables the fast qualification and verification necessary for a first article and first product unit.

An aircraft electrical power system consists of electrical machines, transformers, contacts, power electronics, etc. Typically, the modeling of the system has been solely based on a circuit approach which ignores electric and magnetic field effects by modeling all electromagnetic phenomena as occurring inside each circuit element. In this approach, only circuit variables such as current and voltage are calculated. However, in reality, the governing equations that represent the machines and transformers and similar elements of an aircraft electrical power system are not circuit-based, but rather, are field-based. For example, to consider radiation effects induced by electric and magnetic field couplings in the analysis of electrical power systems, Maxwell's equations have to be solved. Maxwell's equations are a set of coupled partial differential equations relating the EM fields to the current and charge distributions and the material characteristics of a system. Numerical methods known for solving field problems include finite element analysis (FEA), finite difference analysis (FDA), finite boundary analysis (FBA), method of moments (MoM) etc. The equations model real-world physical characteristics such as magnetic, mechanical, thermal, and electromagnetic interference (EMI) phenomenology.

Due to their complexity, the governing partial differential equations are typically simplified and approximated to a set of circuit-based equations necessary to be solvable by available computing resources in a reasonable amount of time. The approximation may introduce large errors into the modeling calculation, making the predictions inaccurately reflect the parameters and performance of the final hardware pieces that are built and tested. Because of the approximation errors, the designs and developments require multiple iterations, resulting in cost increases and schedule delays.

FIG. 1 is a block diagram of a hybrid combination field and circuit modeling method according to an embodiment of the present invention that obviates the previously outlined problems. The method of modeling an electrical power system of an aircraft 100 initially requires the identification of characteristics such as electrical 110, mechanical 112, thermal 114, and electromagnetic interference (EMI) 116 characteristics. Other characteristics may be identified and integrated into the modeling system depending upon the implementation. The characteristics 110, 112, 114, 116 are the initial processes to the model and are input to a processor at 118.

For the modeling of the power electronics of an aircraft electrical power system, the processor may apply a circuit-based solver such as a power electronics circuit solver at 120 to model some of the electrical characteristics. The power electronics circuit solver at 120 is a circuit-based solver that may model a DC to AC convertor or an AC to AC convertor. The resulting solution of the power electronics circuit solver will be a set of currents and voltages that represent the operational values and characteristics for the power electronics of the aircraft power system. Elements of an aircraft power system that may be modeled with the power electronics circuit solver include the electrical machines, the transformers, the contacts and the power electronics. Other electrical devices may be modeled in this way depending upon the implementation.

The remaining characteristics including but not limited to additional electrical, mechanical, thermal, and EMI characteristics are simultaneously modeled with a field-based approach. According to an embodiment of the present invention, the electrical characteristics may be further refined with the voltage and current values from step 120. The field-based solver is a finite element method that has at least three distinct computative steps. The steps include initiating a mesh of a finite element system such as steps 122, 132, 134, 136, and 138; forming a matrix to represent the state characteristics of the finite element system such as steps 124, 140, 144, 148, and 152; and a linear equation solver such as steps 126, 142, 146, 150, and 154. The field-based solver may be any of the well-known finite element methods such as finite element analysis (FEA), finite difference analysis (FDA), or finite boundary analysis (FBA). Other methods may be used depending upon the implementation.

The processor may initiate the finite element method by forming a mesh of a finite element system such as steps 122, 132, 134, 136, and 138. The mesh is a series of nodes that discretize the surface of a modeled structure. Typically, the density of nodes is dependent upon the local complexity of the modeled structure or process; areas known to be dynamic or highly variable are more densely packed with nodes.

Based upon the initiated mesh, a matrix is formed such as steps 124, 140, 144, 148, and 152. The matrix represents a plurality of equations indicative of the state of the characteristics of the finite element system. For modeling an aircraft electrical power system, the characteristics may be the electrical 110, mechanical 112, thermal 114 and EMI 116 characteristics initially input into the processor at 118. Every node of the mesh is modeled with a set of field equations that describe the state of a desired characteristic at the node. At each node, the set of field equations are formed such that they are dependent upon some limited set of nearby nodes; forming a sparse matrix representation of the characteristics of the finite element system.

The processor may then solve the matrix with a sparse linear equation solver such as at steps 126, 142, 146, 150 and

154. The sparse linear equation solver may update and solve the matrix to form an estimate of the field-based characteristics of each node of the finite element system. The processor may implement post-processing, such as at steps 128, 156, 158, 160 and 162, to format the resulting solutions into usable or displayable values that can be integrated into additional modeling efforts.

As depicted in FIG. 1, there are five field problems for an electromagnetic device for an aircraft power system such as an electric machine or a transformer according to an embodiment of the invention. The field problems and resulting solvers describe the electrical, mechanical stress, thermal, EMI, and mechanical dynamics characteristics important to the modeling of the aircraft power system. Each of the five field problems are solved in an independent path of the method 100 of the current invention.

The processor models electrical characteristics by initiating a mesh of the finite elements system at step 122, based in part, on the voltage and current values computed in the power electronics circuit solver at step 120. The processor then forms a matrix to represent the state of the electrical characteristics of the aircraft electrical power system at step 124. The processor then updates and solves the matrix for the field-based electrical characteristics at step 126. The processor post-processes the data to format the resulting output at step 128. The processor may then implement an additional circuit-based solver at step 130 to calculate a set of voltages and currents of the power electronics based on the field-based electrical characteristics. The power electronics circuit solver at 130 is a circuit-based solver that may model an AC to DC convertor or an AC to AC convertor.

The processor models mechanical stress characteristics by initiating a mesh of the finite elements system at step 132, based in part, on the voltage and current values computed in the power electronics circuit solver at step 130 and the initial characteristics of the modeled system input at step 118. The processor then forms a matrix to represent the state of the mechanical stress characteristics of the aircraft electrical power system at step 140. The processor then updates and solves the matrix for the field-based mechanical stress characteristics at step 142. The processor post-processes the data to format the resulting output at step 156.

Simultaneous to the modeling of the mechanical stress characteristics, the processor models thermal characteristics by initiating a mesh of the finite elements system at step 134, based in part, on the voltage and current values computed in the power electronics circuit solver at step 130 and the initial characteristics of the modeled system input at step 118. The processor then forms a matrix to represent the state of the thermal characteristics of the aircraft electrical power system at step 144. The processor then updates and solves the matrix for the field-based thermal characteristics at step 146. The processor post-processes the data to format the resulting output at step 158.

Simultaneous to the modeling of the mechanical stress and thermal characteristics, the processor models EMI characteristics by initiating a mesh of the finite elements system at step 136, based in part, on the voltage and current values computed in the power electronics circuit solver at step 130 and the initial characteristics of the modeled system input at step 118. The processor then forms a matrix to represent the state of the EMI characteristics of the aircraft electrical power system at step 148. The processor then updates and solves the matrix for the field-based EMI characteristics at step 150. The processor post-processes the data to format the resulting output at step 160.

Simultaneous to the modeling of the mechanical stress, thermal and EMI characteristics, the processor models mechanical dynamics characteristics by initiating a mesh of the finite elements system at step 138, based in part, on the voltage and current values computed in the power electronics circuit solver at step 130 and the initial characteristics of the modeled system input at step 118. The processor then forms a matrix to represent the state of the mechanical dynamics characteristics of the aircraft electrical power system at step 152. The processor then updates and solves the matrix for the field-based EMI characteristics at step 154. The processor post-processes the data to format the resulting output at step 162.

The processor collates the output of the circuit-based solver and the field-based solver from the post-processed data for each of the system characteristics at step 164 to form a final model of the resulting system. A modeled estimate of the electrical 166, mechanical 168, thermal 170, and EMI characteristics 172 provides an accurate representation of the modeled aircraft electrical power system based on the method of modeling according to an embodiment of the present invention. Based on the high fidelity, real-time outputs of the method of the present invention, further actions such as virtually designing, testing, qualifying, and/or verifying the electrical power system are enabled.

Figure 2:
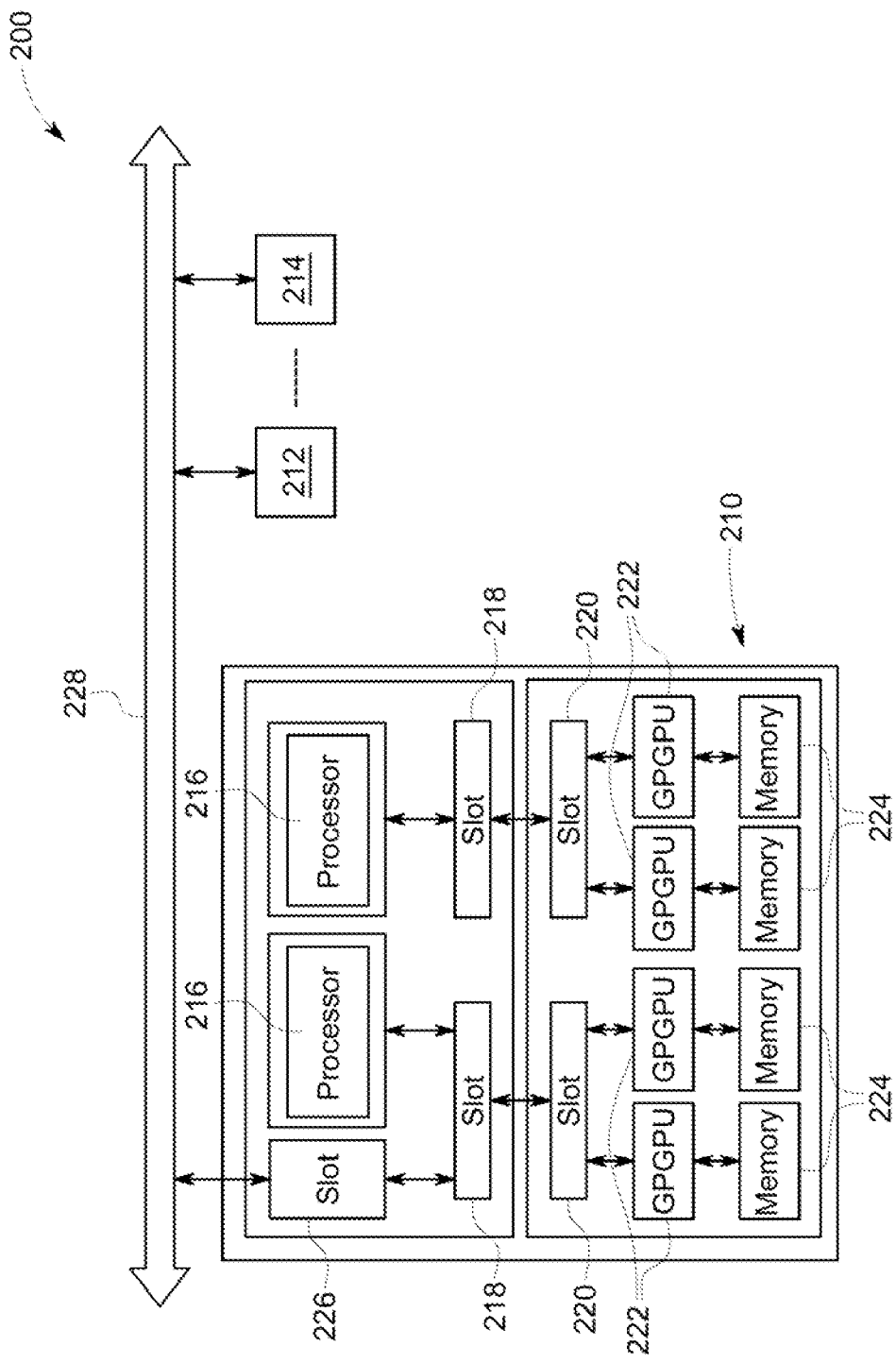
FIG. 2 is a diagram of a prior art GPGPU-based hardware architecture upon which the modeling method of the present invention can be implemented.

In one embodiment of the present invention, the modeling method is implemented on a general purpose graphical processing unit (GPGPU)-based supercomputing cluster 200. FIG. 2 shows an example of such a cluster that may be accessed remotely. Each node, 210, 212, 214 of the cluster may be for example an HP wx9400 workstation equipped with two 2.4 GHz AMD Opteron dual-core 2216 processors 216 with 1 MB of L2 cache and 1 GHz Hyper Transport link and 8 GB (4×2 GB) of DDR2-667 memory 224. Each node 210, 212, 214 has two PCIe Gen1 x16 slots 218, 220 and one PCIe x8 slot 226. The two x16 slots 218, 220 are used to connect to a single Tesla S1070 Computing System (4 GPGPUs) 222 and the x8 slot 226 is used to connect to an InfiniBand QDR adapter 228.

The advantage of such a GPGPU-based supercomputing cluster 200 is that large field-based solvers such as described in FIG. 1 can be distributed to multiple GPGPUs to perform fast parallel processing. Both the matrix formation and the large sparse linear equation solving are distributed to multiple GPGPUs with appropriate algorithms and computed simultaneously. According to the method of the present invention, functionally, there are three distinct groups of processing in terms of computational complexity. The first and smallest group is the circuit-based solver at steps 120 and 130 used for the electronics and power electronics. The second group will initialize the mesh such as at steps 128, 132, 134, 136, and 138; process and update the matrix formation such as at steps 124, 140, 144, 148, and 152 and post-process the results such as at steps 128, 156, 158, 160, and 162. The third and largest group, will solve the sparse linear equations such as at steps 126, 142, 146, 150 and 154.

Figure 3:
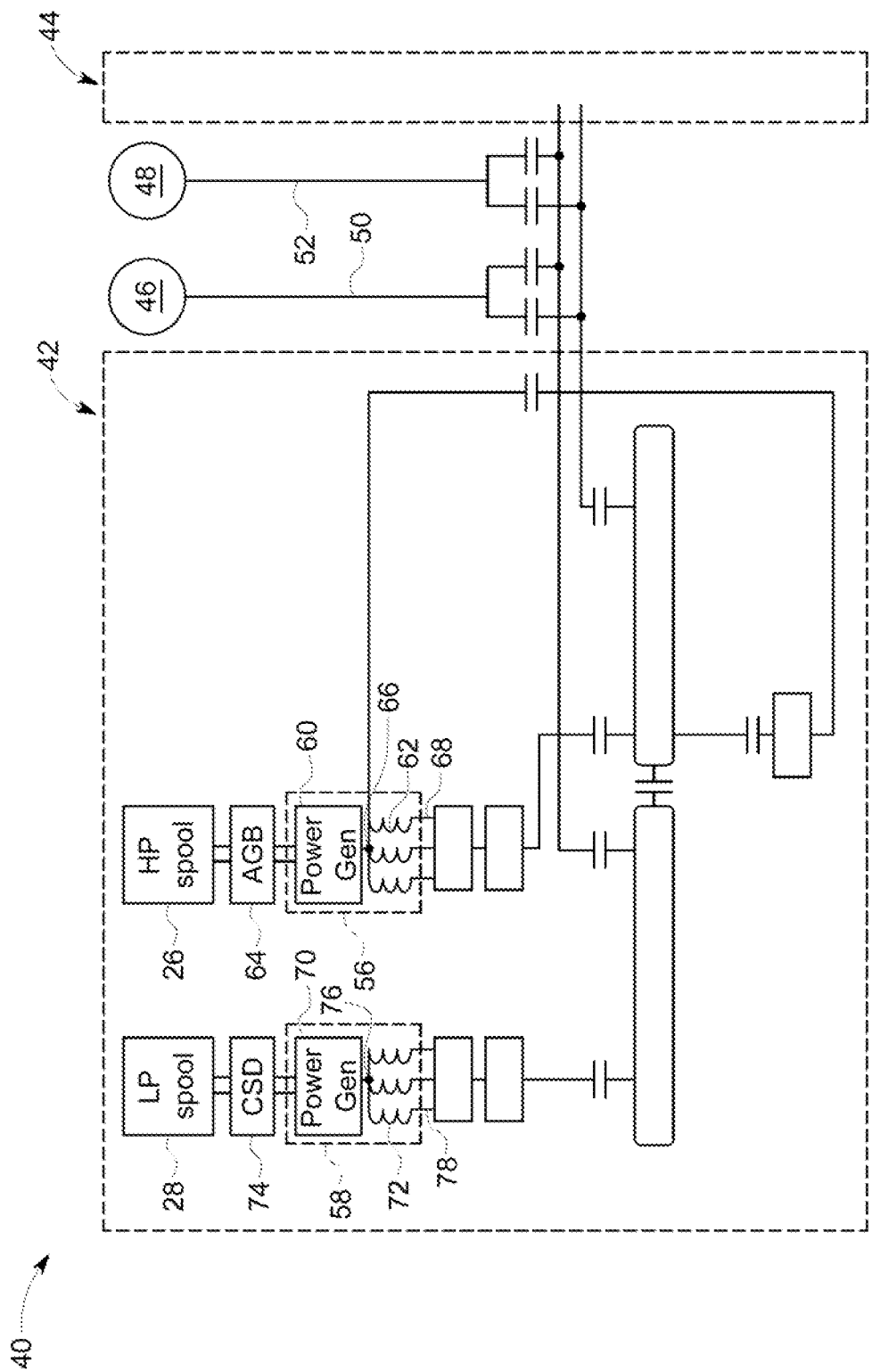
FIG. 3 is a schematic block diagram of an electrical power system architecture for a gas turbine engine that is modeled with a real-time high fidelity simulation according to an embodiment of the invention.

FIG. 3 is a schematic block diagram of an electrical power system architecture 40 for a gas turbine engine that is modeled with a real-time high fidelity simulation according to an embodiment of the invention. The complexity of the system architecture 40 of a modern gas turbine engine helps place in context the method of modeling shown in FIG. 1 and the necessity of a GPGPU-based supercomputing cluster for computation of the method. The system architecture 40 includes multiple engine systems, shown herein as including at least a left engine system 42 and a right engine system 44. The left and right engine systems 42, 44 may be substantially identical; therefore, only the left engine system 42 will be described in detail for the sake of brevity. The left engine system 42 can include the HP and LP spools 26, 28 of the gas turbine engine, although the system architecture 40 has application to other engines as well. The left engine system 42 shown herein uses mechanical power provided by two spools, the HP spool 26 and the LP spool 28. The system architecture 40 can further include an auxiliary power unit (APU) 46 of the aircraft and an external power source (EPS) 48. As shown herein, the APU 46 and EPS 48 each have a DC output 50, 52, respectively.

In the example system architecture 40, the left engine system 42 includes a first autotransformer unit (ATU) integrated generator 56, shown herein as an ATU integrated starter-generator 56, configured to produce variable frequency (VF) AC power from mechanical power supplied by the HP spool 26, and a second ATU integrated generator 58 configured to produce constant frequency (CF) AC power from mechanical power supplied by the LP spool 28.

The ATU integrated starter-generator 56 includes a power generation section 60 and an ATU section 62. The ATU section 62 is integrated with the power generation section 60 by integrating some of the electrical windings necessary for power transformation on the electrical winding of the power generation section 60.

The HP spool 26 can be operably coupled with the ATU integrated starter-generator 56 by an HP drive assembly having an input mechanically coupled to the HP spool 26 and an output mechanically coupled to the power generation section 62. The ATU integrated starter-generator 56 can be mounted and coupled to the accessory gearbox 64. Within the accessory gearbox 64, power may also be transferred to other engine accessories. The power generation section 60 of the ATU integrated starter-generator 56 converts mechanical power supplied by the HP spool 26 into electrical power and produces a power supply 66 having three phase outputs. The ATU section 62 of the ATU integrated starter-generator 56 functions to both transform the three phase outputs of the power supply 66 into a nine phase power output 68 and to step up the voltage of the power supply.

The ATU integrated starter-generator 56 also provides a starting function to the aircraft. Alternatively, the ATU integrated generator 56 on the HP side of the left engine system 42 may comprise a generator that does not provide a starting function to the aircraft. In this case, a separate starter motor connected to the accessory gearbox 60 can be provided to perform the starting function for the aircraft. Furthermore, the left engine system 42 can include multiple generators drawing mechanical power from the HP spool 26 to produce power in order to provide a measure of redundancy.

The ATU integrated generator 58 includes a power generation section 70 and an ATU section 72. The LP spool 28 can be operably coupled with the ATU integrated generator 58 by an LP drive assembly having an input mechanically coupled to the LP spool 28 and an output mechanically coupled to the power generation section 70. The constant speed drive (CSD) 74 can be mechanically coupled to the ATU integrated generator 58 and drives the power generation section 70 at a constant speed. The power generation section 70 of the ATU integrated generator 58 converts mechanical power supplied by the LP spool 28 into electrical power and produces a power supply 76 having three phase outputs. The ATU section 72 of the ATU integrated generator 58 functions to both transform the three phase outputs of the power supply 76 into a nine phase power output 78 and to step up the voltage of the power supply. Due to the CSD, the power supplies 66, 76 will have constant frequency.

An important distinction between the method of the present invention and the conventional modeling approach is that a high fidelity model may be implemented in real-time. Due to the tremendous progress in computing capabilities; the computing speed of the multi-core microprocessors, field-programmable gate array (FPGA) processors, graphic process units (GPUs), and General Purpose GPU (GPGPU) based supercomputing clusters, it is now possible for a paradigm shift to occur and allow the user to move from the circuit approximation to the field calculation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for modeling an electrical power system of an aircraft, comprising:
   using a general purpose graphic processing unit-based supercomputer cluster to execute computer executable components stored in a memory to perform the following acts:
   obtaining a set of initial characteristics for the electrical power system;
   modeling, based on electrical characteristics included in the set of initial characteristics, a set of currents and voltages via a power electronics circuit based-solver;
   modeling, via a field-based solver, at least one characteristic included in the set of initial characteristics, wherein the modeling includes:
   initiating a mesh for the at least one characteristic,
   forming a matrix based at least in part on the mesh, and
   solving the matrix, via a sparse linear equation solver, to represent the state of the at least one characteristic,
   wherein the sparse linear equation solver includes at least one of finite element analysis or finite difference analysis, and at least one of: the initiating the mesh, the forming the matrix, or the solving the matrix are distributed to multiple graphic processing units; and
   forming a final model of the electrical power system by collating outputs of the circuit-based solver and the field-based solver.

2. The method of claim 1, wherein the set of currents and voltages represent operational values and characteristics of power electronics of the electrical power system of the aircraft.

3. The method of claim 1, wherein the initiating the mesh includes initiating the mesh based at least in part on the set of currents and voltages modeled via the power electronics circuit-based solver.

4. The method of claim 1, wherein the initiating the mesh includes initiating a series of nodes that discretize the surface of a modeled structure.

5. The method of claim 1, wherein the matrix represents a plurality of equations indicative of a state of the at least one characteristic.

6. The method of claim 1, wherein the at least one characteristic includes at least one of: electrical, mechanical stress, thermal, electromagnetic interference, or mechanical dynamics.

7. The method of claim 1, further comprising employing an additional circuit-based solver to determine another set of voltages and currents of power electronics included in the electrical power system based on field-based electrical characteristics.

8. The method of claim 1, wherein the sparse linear equation solver includes finite boundary analysis.

9. The method of claim 1, wherein the general purpose graphic processing unit-based supercomputer cluster enables parallel processing.

10. The method of claim 1, wherein the electrical power system includes at least one of an electrical machine, a transformer, a contact, or a set of power electronics.

11. The method of claim 1, wherein the circuit based-solver represents at least one of a DC-to-AC converter or an AC-to-AC converter.

12. The method of claim 7, wherein the additional circuit based-solver represents at least one of an AC-to-DC converter or an AC-to-AC converter.

13. The method of claim 1, further comprising at least one of designing, testing, qualifying, or verifying the electrical power system based on the final model.

\* \* \* \* \*